United States Patent [19]

Parenti, Jr.

[11] Patent Number: 4,847,051
[45] Date of Patent: Jul. 11, 1989

[54] REFORMER TUBE HEAT TRANSFER DEVICE

[75] Inventor: Edmund K. Parenti, Jr., Manchester, Conn.

[73] Assignee: International Fuel Cells Corporation, South Windsor, Conn.

[21] Appl. No.: 170,475

[22] Filed: Mar. 21, 1988

[51] Int. Cl.⁴ .......................... F28D 7/10; F28D 21/00
[52] U.S. Cl. .................................. 422/202; 422/200; 422/20; 422/197; 422/312; 165/156; 138/38
[58] Field of Search ............... 422/200, 201, 202, 196, 422/197, 310, 312; 165/156, 160; 138/37, 38, 39, 111, 112, 113, 148

[56] References Cited

U.S. PATENT DOCUMENTS

| | | | |
|---|---|---|---|
| 2,409,304 | 4/1943 | Morrison | 138/113 |
| 2,900,168 | 8/1959 | Nyborg | 165/154 |
| 3,464,450 | 9/1969 | Steffenini | 138/113 |
| 3,730,229 | 5/1973 | D'Onofrio | 138/114 |
| 4,111,402 | 9/1978 | Barbini | 366/338 |
| 4,402,361 | 9/1983 | Dominguez | 165/156 |
| 4,559,999 | 12/1985 | Servas et al. | 165/156 |
| 4,661,323 | 4/1987 | Olesen | 422/197 |

FOREIGN PATENT DOCUMENTS 295245  8/1928  United Kingdom ............... 165/156

Primary Examiner—Michael S. Marcus
Assistant Examiner—D. John Griffith, Jr.
Attorney, Agent, or Firm—William W. Jones; Edward L. Kochey, Jr.

[57] ABSTRACT

Heat is more efficiently transferred to the catalyst tubes in a fuel cell power plant reformer by mounting sleeves about the individual catalyst tubes. The sleeves define helical hot gas flow paths on the outside of the catalyst tubes. Adjacent flow paths are separated from each other by arcuate ribs between the tubes and sleeves that provide line contact with the outer surface of the tubes for improved heat transfer. The ribs may be formed with circular rods attached to the tubes or sleeves, or by helical grooves with semi-circular configurations formed in the sleeves. Approximately fifty percent greater heat transfer can be achieved using the line contact ribs to form the hot gas flow paths. The sleeves, tubes and ribs are all made of metal.

1 Claim, 2 Drawing Sheets

REFORMER TUBE HEAT TRANSFER DEVICE

TECHNICAL FIELD

This invention relates to an assembly for improving the heat transfer to a catalyst tube in a fuel cell power plant catalytic fuel reformer.

BACKGROUND ART

Raw hydrocarbon fuel is catalytically reformed into a hydrogen rich fuel gas prior to being fed into the power section of a fuel cell power plant. The reforming of the raw fuel is typically performed in catalytic beds disposed in tubular containers which are enclosed in a reformer housing. The raw fuel mixed with steam will be fed into the reformer housing and into the catalyst beds, and the reformed fuel gas is drawn off of the catalyst beds and removed from the housing for transfer to the power section. The reformer housing will also include a burner which heats the tubes and catalyst beds to operative temperatures for supporting the reaction. In the larger fuel cell power plants which have higher power ratings, each reformer housing will contain a number of catalyst tubes, all of which should be heated to the same extent for optimum reformer efficiency. These larger reformer housings will typically have a single burner to heat all of the catalyst tubes, so that a problem arises as to how all of the tubes in the housing will be heated to the same optimum temperature with only one burner. This problem of evenly distributing the heat from the reformer burner among all of the catalyst tubes is addressed in U.S. Pat. No. 4,661,323 to O. L. Olesen, granted Apr. 28, 1987. The aforesaid patent discloses the use of ceramic sleeves which are fitted onto the catalyst bed tubes. The sleeves are provided with a plurality of helical grooves which are cut into the bores of the sleeves and which provide flow paths for the hot burner gases around the outside of the tubes. The helical grooves are separated from each other by helical lands which engage the tubes in curvilinear planar contact. The helical lands overlie and cover about 25 to 35% of the external surface of the catalyst tubes, and thus actually insulate the catalyst tubes from the heated gases to a significant degree. This is, of course undesirable, and limits the efficiency of the reformer so that the fuel being reformed must be passed through the reformer at a slower rate to ensure the proper degree of reformation of the raw fuel to the hydrogen rich fuel gas. Another problem arising with the prior art ceramic sleeves relates to their inelasticity, which renders it difficult to properly fit them onto the metal catalyst tubes. Finally, the different coefficients of thermal expansion and contraction between the metal tubes and ceramic sleeves creates problems with the interfit while the reformer is in operation. In operation, there will be a temperature difference of from 300° to 500° F. from the top of the catalyst tubes to the bottom, with a reformer of the type shown in U.S. Pat. No. 4,661,323, referred to above.

DISCLOSURE OF INVENTION

The assembly of this invention provides for improved heat transfer to the catalyst tubes, such that the efficiency of the reformer can be increased by 5 to 10% at fixed flow rates, or the fuel flow rate can be increased by up to 50% at a fixed reformer efficiency. This means that a reformer having twenty catalyst tubes and using the assembly shown in the U.S. Pat. No. 4,661,323 can operate with only 13 catalyst tubes using the assembly of this invention, and can still reform the same amount of fuel at the same rate as the larger prior art reformer. In the assembly of this invention, the helical grooves are separated from each other by helical ribs. The helical ribs are formed with a curvilinear cross-sectional configuration so that the surface of the ribs which contacts the tubes is convex with respect to the outer surface of the tubes. The result is that the ribs form only line contact with the outer surface of the tubes, thereby covering only about 1–3% of the outer surface of the tubes. The ribs are also made of a heat conducting, rather than insulating, material, such as metal, thus they conduct heat to the tubes even where they touch the tubes. The ribs can be formed by attaching round rod stock to the catalyst tubes, preferably by spot welding, or the ribs can be formed as integral parts of the sleeves, by appropriately contouring the sleeves. The sleeves, in either case, will preferably be made of sheet steel, and will be wrapped around the tubes, tightened in place by tightenable collars, or the like, and then welded together where they overlap. The sleeves can thus be tightly secured to the catalyst tubes, and the hot gas paths will expose substantially all of the exterior surface of the tubes to the heat from the hot burner gases. In addition, the assembly of this invention is less expensive and easier to produce than that of the prior art which employs the ceramic sleeves.

It is therefore an object of this invention to provide a heat transfer assembly for use in heating fuel cell power plant reformer catalyst tubes which maximizes heat transfer from hot burner gases to the catalyst tubes.

It is a further object of this invention to provide an assembly of the character described which can reduce the size of catalytic reformers as compared to conventional assemblies by up to 30%.

It is an additional object of this invention to provide an assembly of the character described which is inexpensive to produce, easily assembled, and which produces a tight, yet flexible, heat transfer zone.

These and other objects and advantages of the invention will become more readily apparent from the following detailed description of preferred embodiments thereof, when taken in conjunction with the accompanying drawings, in which:

BEST MODE FOR CARRYING OUT THE INVENTION

Figures 1, 3, 4:
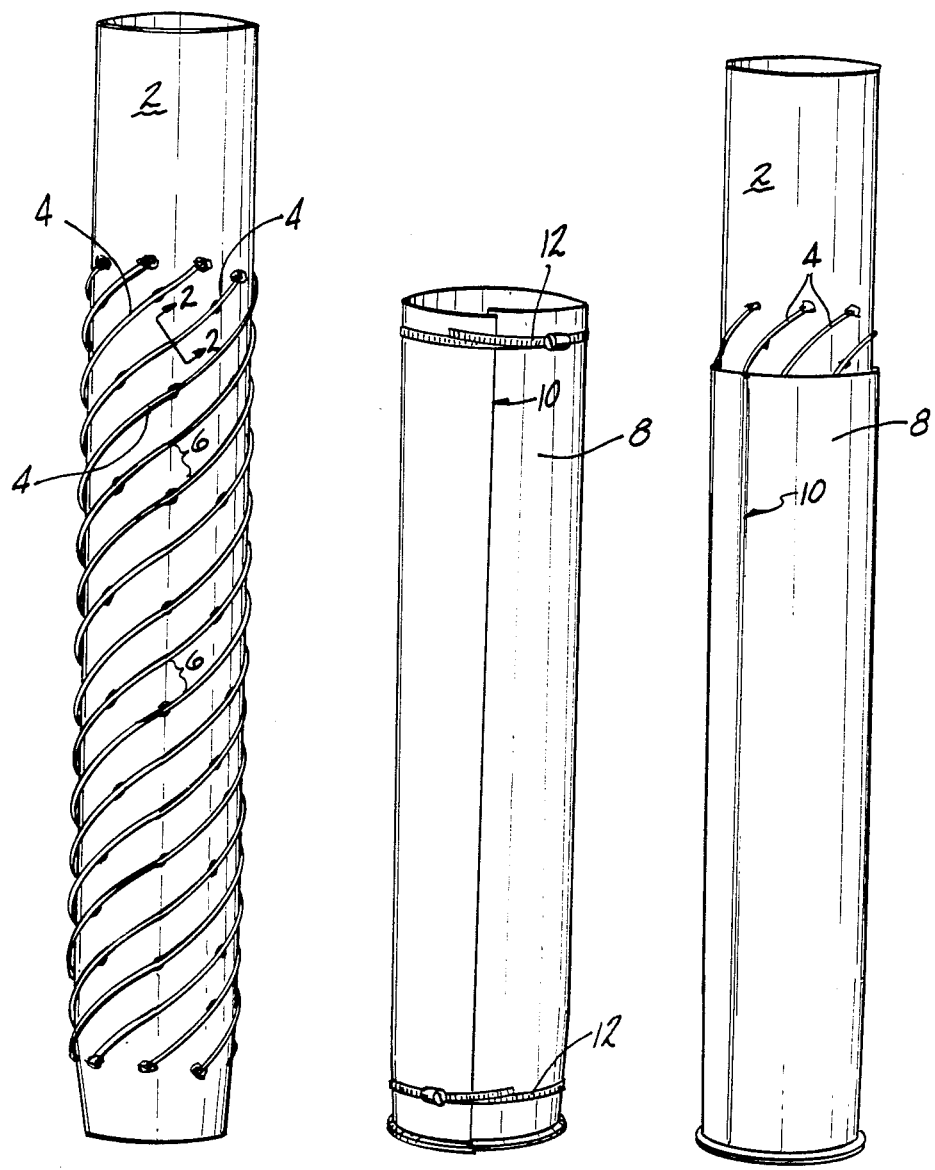
FIG. 1 is a side elevational view of a catalyst reformer tube having a plurality of circular rods wound in helical fashion about its outer surface to form the hot gas passages.
FIG. 3 is a side elevational view of a sleeve precursor for mounting on the tube.
FIG. 4 is a side elevational view of the tube and sleeve assembled for installation in a reformer housing.
Figure 2:
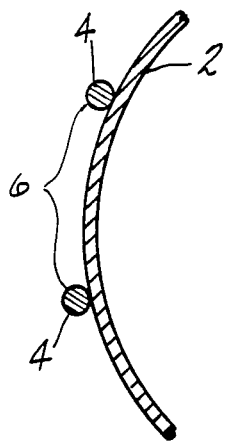
FIG. 2 is a sectional view taken along line 2—2 of FIG. 1.

Referring now to the drawings, a first embodiment of the invention is shown in FIGS. 1-4. The catalyst tube is denoted generally by the numeral 2, and there are a plurality of circular steel rods 4 mounted on the outside surface of the tube 2. Each of the rods 4 defines a helical rib on the outside of the tube 2, which ribs have circular cross-sections. The rods 4 are preferably spot welded to the tube 2. The gaps 6 define the helical flow paths which the hot burner gases will traverse when the reformer is operated. FIG. 2 illustrates the cross-sectional configuration of the rods 4 and highlights the fact that the rods 4 make only line contact with the exterior of the tubes 2. Even the line contact is minimized because the rods 4 are preferably spot welded onto the tube 2 so that the hot burner gases can flow between the rods 4 and tube 2 in all places devoid of the spot welds.

The sleeve 8 which fits over the rod and tube assembly of FIG. 1 is shown in FIG. 3. The sleeve 8 is preferably formed from sheet steel which is formed into a cylinder so that the two ends of the sheet will overlap at 10. When assembling the tube and sleeve, cinching straps 12 will be fitted onto the outside of the sleeve 8. The sleeve 8 is telescoped over the tube 2 and rods 4, as shown in FIG. 4, and the straps 12 are tightened to snugly clamp the sleeve 8 about the rods 4. The overlap 10 is then welded together, and the straps 12 removed. The finished assembly is shown in FIG. 4.

Figure 5:
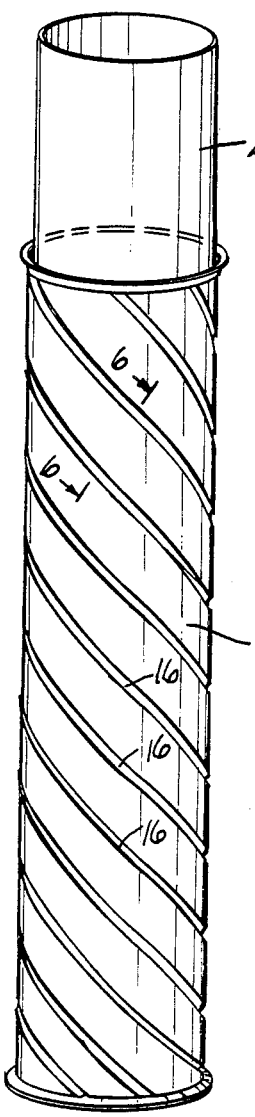
FIG. 5 is a side elevational view of an alternative embodiment of the invention wherein the ribs are formed integrally on the sleeve.
Figure 6:
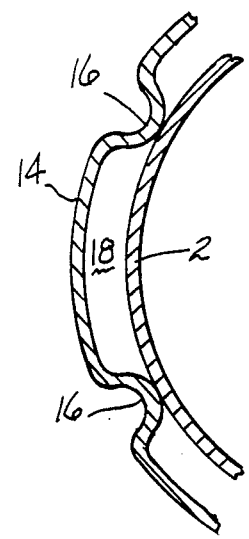
FIG. 6 is a sectional view taken along line 6—6 of FIG. 5.

Referring now to FIGS. 5 and 6, an alternate embodiment of the assembly of this invention is shown. The sleeve 14 is again formed from sheet steel, and is provided with a plurality of helical grooves 16 which have a semi-circular configuration, as shown in FIG. 6. The grooves 16 thus form line contact with the tube 2. The gaps 18 between adjacent grooves 16 form the hot burner gas flow paths. Due to the line contact between the grooves 16 and tube 2, a maximum of the tube surface is exposed to the hot gases in each flow path 18.

Figure 7:
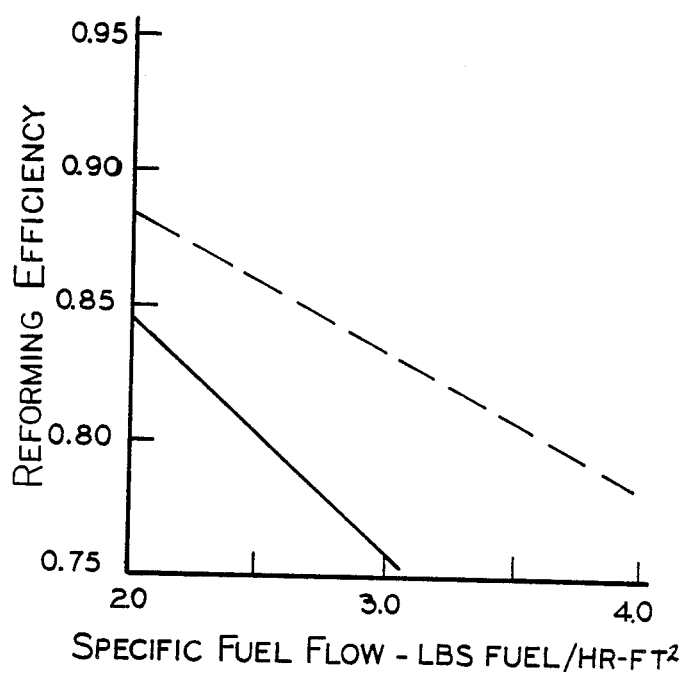
FIG. 7 is a plot showing a comparison of the performance of the embodiment of the invention shown in FIG. 5 with a heat transfer assembly using a ceramic sleeve as shown in the prior art.

FIG. 7 illustrates the improved operation of a reformer using the sleeves shown in FIGS. 5 and 6 compared to the heat transfer sleeves shown in U.S. Pat. No. 4,661,323. The y-axis of the plot represents reformer efficiency, and the x-axis represents the flow rate of fuel passing through the reformer and biing reformed therein. It will be noted that a reformer efficiencies below 75% are not acceptable. The broken line represents the performance of the assembly of this invention, and the solid line represents the performance of the prior art assembly. It will be noted that the assembly of this invention performs at a consistently higher efficiency level than the prior art, and can achieve both efficiency levels and fuel processing flow rates which are unattainable by prior art assembly.

It will be readily appreciated that the assembly of this invention displays superior performance because of its increased heat transfer capabilities. The use of ribs which establish only line contact with the reformer tubes remarkably increases heat transfer from burner gases traversing the helical flow passages. The use of a metal sleeve which can be clamped over the tube and rib assembly to achieve a tighter fit is an important feature of the invention. The assemblies are quickly and easily produced from relatively standard materials, and thus are relatively inexpensive to make.

Since many changes and variations of the disclosed embodiments of the invention may be made without departing from the inventive concept, it is not intended to limit the invention otherwise than as required by the appended claims.

What is claimed is:

1. For use in a catalytic reformer fuel processor in a fuel cell power plant, a catalyst tube assembly comprising:
   (a) a cylindrical metal tube having a bore and an exterior and adapted to contain a catalyst bed in its bore;
   (b) a sleeve having a bore fitted around the exterior of said tube and coaxial therewith, the bore of said sleeve being spaced radially outwardly from said tube exterior;
   (c) a plurality of ribs disposed between said tube and sleeve for forming helical hot gas flow paths around the exterior of said tube, said ribs having arcuate surfaces providing line contact with the exterior of said tube whereby substantially all of the exterior of said tube is disposed in heat transfer relationship with hot gases flowing through said helical flow paths said ribs being formed by a plurality of round rods which are bent along helical paths on the exterior of said tube and spot welded to said tube at spaced apart points so that hot gases may flow between said rods and tube at locations between the spot welds; and
   (d) said sleeve being formed from a metal sheet which is bent around said tube and compressively tightened thereabout to form a tight interfit between said sleeve and ribs, which interfit is not loosened by thermal expansion or contraction of said tube or sleeve when the fuel processor is operated.

* * * * *